United States Patent [19]

Kumagai et al.

[11] Patent Number: 5,006,957
[45] Date of Patent: Apr. 9, 1991

[54] SEMICONDUCTOR PORCELAIN SUBSTRATE, DIELECTRIC PORCELAIN SUBSTRATE AND CAPACITOR EMPLOYING THE COMPOSITION

[75] Inventors: Motoo Kumagai, Yokohama; Keiichi Kato, Tokyo; Humio Takeuti, Iwamisawa; Masato Nagano, Iwamisawa; Michiaki Sakaguchi, Iwamisawa, all of Japan

[73] Assignees: Canon Kabushiki Kaisha; Nippon Oil & Fats Co., Ltd., both of Tokyo, Japan

[21] Appl. No.: 534,354

[22] Filed: Jun. 7, 1990

Related U.S. Application Data

[63] Continuation of Ser. No. 196,478, May 20, 1988, abandoned.

[30] Foreign Application Priority Data

May 20, 1987 [JP] Japan ............... 62-124530

[51] Int. Cl.$^5$ ............... H01G 4/12; C04B 35/46
[52] U.S. Cl. ............... 361/321; 501/134; 501/136; 252/520
[58] Field of Search ............... 252/520; 501/134, 135, 501/136; 361/321

[56] References Cited

U.S. PATENT DOCUMENTS

| | | | |
|---|---|---|---|
| 2,648,804 | 8/1963 | Steigeralt et al. | 361/401 |
| 4,362,637 | 12/1982 | Matsuo et al. | 252/520 X |
| 4,405,480 | 9/1983 | Murase et al. | 252/520 X |
| 4,519,942 | 5/1985 | Yamaoka et al. | 252/520 |
| 4,541,974 | 9/1985 | Yamaoka et al. | 252/520 X |
| 4,545,929 | 10/1985 | Masuyama et al. | 252/520 |
| 4,547,314 | 10/1985 | Masuyama et al. | 252/520 |
| 4,610,969 | 9/1986 | Wada et al. | 501/138 |
| 4,610,970 | 9/1986 | Wada et al. | 501/138 |
| 4,654,750 | 3/1987 | Kumagai et al. | 361/321 |
| 4,736,230 | 4/1988 | Kumagai et al. | 357/10 |
| 4,759,965 | 7/1988 | Kato et al. | 478/138 |
| 4,781,859 | 11/1988 | Noi | 252/520 |

FOREIGN PATENT DOCUMENTS

| | | | |
|---|---|---|---|
| 0157276 | 10/1985 | European Pat. Off. | 501/136 |
| 60-088401 | 5/1985 | Japan | 501/136 |
| 60-107803 | 5/1985 | Japan | 501/136 |
| 60-107804 | 5/1985 | Japan | 501/136 |

*Primary Examiner*—Karl Group
*Attorney, Agent, or Firm*—Fitzpatrick, Cella Harper & Scinto

[57] ABSTRACT

A ceramic-forming composition comprises from 2.0 to 5.0 mol parts of $MnO_2$ and from 0.05 to 0.30 mol part of $Y_2O_3$ based on 100 mol parts of a main component comprising from 50.20 to 53.50 mol % of $TiO_2$ and from 49.80 to 46.50 mol % of SrO. A semiconductor porcelain substrate, a dielectric porcelain substrate and a capacitor are produced by using the same ceramic-forming composition.

15 Claims, 1 Drawing Sheet

SEMICONDUCTOR PORCELAIN SUBSTRATE, DIELECTRIC PORCELAIN SUBSTRATE AND CAPACITOR EMPLOYING THE COMPOSITION

This application is a continuation-in-part of application Ser. No. 07/196,478 filed May 20, 1988, now abandoned.

BACKGROUND OF THE INVENTION

1. Field of the Invention

The present invention relates to a ceramic-forming composition, and a semiconductor porcelain substrate, a dielectric porcelain substrate and a capacitor that employ the composition.

2. Related Background Art

Semiconductor porcelains comprising an insulating layer formed at crystal grain boundaries have, in general, a large dielectric constant. It has been known to use such semiconductor porcelains to constitute capacitors having a large capacitance. Hitherto widely used as the semiconductor porcelains of this type have been porcelains mainly comprised of barium titanate. Such materials have a dielectric constant of as large as 70,000, but nonetheless have a dielectric loss (tan δ) of as large as 5 to 6% (1 kHz) and also a temperature variation of dielectric constant, of as large as 50% within the range of from $-25°$ to $+85°$ C. around the reference temperature of $+20°$ C.

On the other hand, known as porcelains that improve tan δ or temperature variation of dielectric constant of barium titanate are porcelains mainly comprised of strontium titanate. They are exemplified by a porcelain disclosed in Japanese Patent Publication No. 60-48897 as Sample No. 5, comprising 97.5 mol % of $SrTiO_3$ as a main component to which 1.7 mol % of $MnO_2$ and 0.8 mol % of $Y_2O_3$ are added. This has a good tan δ of 0.6% and a good temperature variation of dielectric constant at $-25°$ to $+85°$ C., of within $-7\%$ to $+6\%$, but has a dielectric constant of as low as about 51,000.

SUMMARY OF THE INVENTION

The present invention was made to provide a ceramic-forming composition, and a semiconductor porcelain substrate, a dielectric porcelain substrate and a capacitor that employ the composition, which can solve the above problems conventionally involved and can constitute a capacitor having a large dielectric constant, as well as good temperature characteristics, and having a small dielectric loss.

The present invention was also made to provide a ceramic-forming composition comprising from 2.0 to 5.0 mol parts of $MnO_2$ and from 0.05 to 0.30 mol part of $Y_2O_3$ based on 100 mol parts of a main component comprising from 50.20 to 53.50 mol % of $TiO_2$ and from 49.80 to 46.50 mol % of SrO.

The present invention was still also made to provide a semiconductor porcelain substrate comprising a fired product of a ceramic-forming composition containing from 2.0 to 5.0 mol parts of $MnO_2$ and from 0.05 to 0.30 mol part of $Y_2O_3$ based on 100 mol parts of a main component comprising from 50.20 to 53.50 mol % of $TiO_2$ and from 49.80 to 46.50 mol % of SrO.

The present invention was still also made to provide a dielectric porcelain substrate comprising an insulating layer present at crystal grain boundaries of a semiconductor porcelain comprising a fired product of a ceramic-forming composition containing from 2.0 to 5.0 mol parts of $MnO_2$ and from 0.05 to 0.30 mol part of $Y_2O_3$ based on 100 mol parts of a main component comprising from 50.20 to 53.50 mol % of $TiO_2$ and from 49.80 to 46.50 mol % of SrO.

The present invention was still also made to provide a capacitor comprising a pair of electrodes; and a dielectric porcelain interposed between said electrodes and comprising an insulating layer present at crystal grain boundaries of a semiconductor porcelain comprising a fired product of a ceramic-forming composition containing from 2.0 to 5.0 mol parts of $MnO_2$ and from 0.05 to 0.30 mol part of $Y_2O_3$ based on 100 mol parts of a main component comprising from 50.20 to 53.50 mol % of $TiO_2$ and from 49.80 to 46.50 mol % of SrO.

DETAILED DESCRIPTION OF THE PREFERRED EMBODIMENTS

Figure 1:
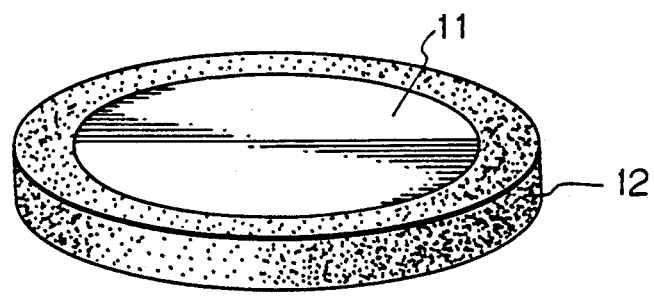
FIG. 1 is a diagramatical perspective view illustrating an example of the capacitor of the present invention.

The ceramic-forming composition to be provided by the present invention (hereinafter "ceramic-forming composition of the present invention") is characterized by containing from 2.0 to 5.0 mol parts of $MnO_2$ and from 0.05 to 0.30 mol part of $Y_2O_3$ based on 100 mol parts of a main component comprising from 50.20 to 53.50 mol % of $TiO_2$ and from 49.80 to 46.50 mol % of SrO.

The semiconductor porcelain substrate to be provided by the present invention (hereinafter "semiconductor porcelain substrate of the present invention") is characterized by comprising a fired product of the ceramic-forming composition of the present invention.

The dielectric porcelain substrate to be provided by the present invention (hereinafter "dielectric porcelain of the present invention") is characterized by comprising an insulating layer present at crystal grain boundaries of a semiconductor porcelain comprising a fired product of the ceramic-forming composition of the present invention.

The capacitor to be provided by the present invention (hereinafter "capacitor of the present invention") is characterized by comprising a pair of electrodes; and a dielectric porcelain interposed between said electrodes and comprising an insulating layer present at crystal grain boundaries of a semiconductor porcelain comprising a fired product of the ceramic-forming composition of the present invention.

The ceramic-forming composition of the present invention may contain $SiO_2$ as a component other than the above $TiO_2$, SrO, $MnO_2$ and $Y_2O_3$. $SiO_2$ may suitably be contained in an amount of from 0.01 to 2.00 mol parts based on 100 mol parts of the above main component comprising from 50.20 to 53.50 mol % of $TiO_2$ and from 49.80 to 46.50 mol % of SrO.

The constitution of the present invention will be described below in greater detail.

In the ceramic-forming composition of the present invention, the main components $TiO_2$ and SrO may be present in the composition in the form of a compound oxide such as a solid solution, a sole oxide comprising each of $TiO_2$ and SrO, or a mixture of any of these. The amount ratio between $TiO_2$ and SrO in the composition is made to be from 49.80 to 46.50 mol % of SrO based on 50.20 to 53.50 mol % of $TiO_2$, for the reason that an overly large amount of $TiO_2$, in other words, an overly small amount of SrO, may result in a lowering of the dielectric constant of a desired dielectric porcelain and an increase in the dielectric loss and the temperature variation of dielectric constant, and moreover a decrease in the insulation resistance of the porcelain. An overly small amount of $TiO_2$, in other words, an overly large amount of SrO, may result in a lowering of the dielectric constant of a desired dielectric porcelain and an increase in the temperature variation of dielectric constant. The amount ratio between $TiO_2$ and SrO in the composition is determined so that the desired characteristics for these dielectric constant, dielectric loss, temperature variation of dielectric constant, insulation resistance, capability of being made semiconductive and so forth may be exhibited in a well-balanced and optimum state.

Thus, the present invention is for one thing characterized in that the amount ratio is set particularly within a given range in which $TiO_2$ is at an excessive side.

In the ceramic-forming composition of the present invention, $MnO_2$ plays a role as a sintering aid for forming a porcelain, and the amount for its use is limited to 2.0 mol parts or more based on 100 mol parts of the above main component comprising $TiO_2$ and SrO for the reason that the amount of $MnO_2$ otherwise less than 2.0 mol parts may result in a lowering of dielectric constant of a desired dielectric porcelain and at the same time an increase in the temperature variation of dielectric constant. The amount is also limited to 5.0 mol parts or more based on 100 mol parts of the above main component comprising $TiO_2$ and SrO for the reason that the amount of $MnO_2$ otherwise more than 5.0 mol parts may result in a remarkable increase in the dielectric loss.

As described above, in the present invention, the amount ratio between $TiO_2$ and SrO is set within a given range in which $TiO_2$ is at an excessive side and a large amount (2 mol parts or more) of $MnO_2$ is used, so that presumably the sintering is promoted and further there is produced a state of being readily reduced because of the excessive $TiO_2$.

Next, in the ceramic-forming composition of the present invention, $Y_2O_3$ has the effect of making a porcelain semiconductive, and the amount for its use is limited to 0.05 mol part or more based on 100 mol parts of the above main component comprising $TiO_2$ and SrO for the reason that the amount of $Y_2O_3$ otherwise less than 0.05 mol part may result in insufficiency in making a porcelain semiconductive and also a lowering of the dielectric constant. The amount is also limited to 0.3 mol part or less based on 100 mol parts of the above main component comprising $TiO_2$ and SrO for the reason that the amount of $Y_2O_3$ otherwise more than 0.3 mol part may cause suppression of grain growth of crystals, and result in a lowering of the dielectric constant and an increase in the dielectric loss.

Thus, the present invention is for another thing characterized in that a large amount of $MnO_2$ and a relatively trace amount of $Y_2O_3$ are used as compared with Japanese Patent Publication No. 60-48897 previously mentioned. Namely, in the present invention, presumably the mutual action between $MnO_2$ and $Y_2O_3$, and further the above mentioned excessive $TiO_2$, controls the characteristics relating to the grain size and grain boundaries to obtain a very large dielectric constant, good dielectric loss characteristics, etc.

The $SiO_2$ component which is optionally added in the ceramic-forming composition of the present invention also has the action of serving as a grain boundary improver of the semiconductor porcelain.

When an additive serving as a component that diffuses to crystal boundaries is applied on the surface of a semiconductor porcelain followed by calcination in an oxidative atmosphere such as air to effect the diffusion of the additive to the crystal grain boundaries, this grain boundary improver makes uniform the diffusion of the additive to the crystal grain boundaries, thus contributing the improvement of the insulation resistance and the lowering of the dielectric loss. However, when $SiO_2$ is used expecting to obtain such effect, the amount for using $SiO_2$ which is less than 0.01 mol part based on 100 mol parts of the above main component comprising $TiO_2$ and SrO may not bring about any sufficient effect, and the amount more than 2.00 mol parts may result in an increase in the thickness of the insulating layer at the grain boundaries and a lowering of the dielectric constant of a desired dielectric porcelain, undesirably.

To obtain the semiconductor porcelain substrate of the present invention by using the ceramic-forming composition of the present invention thus constituted, generally available are methods in which a molded body (a pressed body) of the ceramic-forming composition of the present invention is prepared and this is then fired. For example, to raw material powder containing $TiO_2$, SrO, $MnO_2$ and $Y_2O_3$, and $SiO_2$ optionally added, a binder such as polyvinyl alcohol is added to carry out granulation, followed by press molding to obtain a molded body (a pressed body). Subsequently this molded body is calcined at 600° to 1,200° C. in an oxidative atmosphere to remove therefrom the binder. The resulting calcined product is next fired desirably at 1,320° C. to 1,450° C., in a reductive atmosphere such as a mixed gas of hydrogen with nitrogen and a mixed gas of hydrogen with argon or a neutral atmosphere such as nitrogen and argon, more preferably in the reductive atmosphere, to obtain the semiconductor porcelain substrate.

An insulating layer may also be formed at the crystal boundaries of the semiconductor porcelain that employs the ceramic-forming composition of the present invention obtained, for example, by the method described above, whereby the dielectric porcelain substrate of the present invention can be obtained. Methods for forming the insulating layer may include a method in which an additive serving as a component that diffuses to crystal boundaries is applied on the surface of the semiconductor porcelain substrate followed by baking. The baking may desirably be carried out at 1,100° to 1300° C. in an oxidative atmosphere.

Usable as the additives are any conventionally known additives for forming insulating layers at crystal grain boundaries of semiconductor porcelains. For example, oxides of iron, cobalt, bismuth, vanadium, chromium, lead, copper, etc., as well as bismuth oxide, a mixture of bismuth oxide with copper oxide, and sodium oxide, can be particularly suitably used in the present invention. Employment of these can bring about good results in relation to the effect of improving the dielectric constant, temperature characteristics of dielectric constant, insulation resistance and dielectric loss of the dielectric porcelain as aimed in the present invention.

Of these, most suitably used in the present invention as the additive for forming the insulating layer are a mixture of bismuth oxide and copper oxide. When this is used there can be obtained a dielectric porcelain having very good characteristics particularly in respect of the insulation resistance. In the above mixture, the ratio of bismuth oxide to copper oxide may preferably be in the range of from bismuth oxide/copper oxide=90/10 to 60/40 (in weight ratio). This is because the above ratio otherwise varying in the direction to which the copper oxide is less than 90/10 makes it difficult to expect a great improvement in the insulation resistance, and on the contrary the above ratio otherwise varying in the direction to which the copper oxide is more than 60/40 may cause a lowering of the dielectric constant.

Also, a very remarkable improvement in the dielectric constant and insulation resistance can be seen when the mixture of bismuth oxide with copper oxide is used as an insulating-layer-forming additive to the semiconductor porcelain substrate comprising the ceramic-forming composition containing 0.01 to 0.1 mol part of $SiO_2$ based on 100 mol parts of the above main component comprising $TiO_2$ and SrO. In this instance, the ratio of bismuth oxide to copper oxide in the above mixture may particularly preferably be in the range of from bismuth oxide/copper oxide=90/10 to 60/40 (in weight ratio) like the above-mentioned.

The insulating-layer-forming additive may take the form of these oxides as a result of baking, and may take the form of, for example, oxides, nitrides, carbonates or the like when it is applied to the surface of the semiconductor porcelain.

The dielectric porcelain that employs the ceramic-forming composition of the present invention obtained, for example, by the method described above, may further be interposed between a pair of electrodes, whereby the capacitor of the present invention can be constituted.

Figure 2:
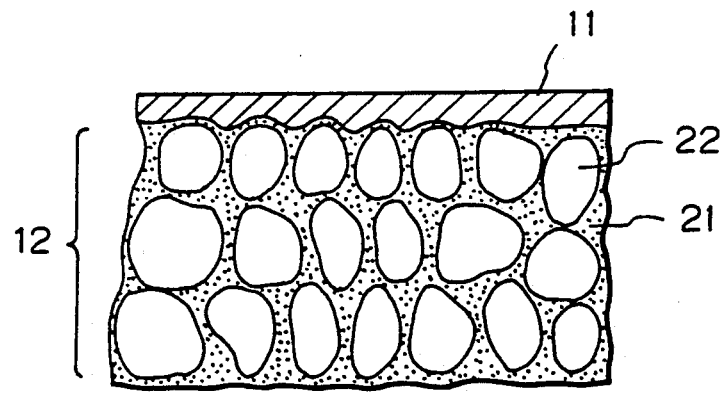
FIG. 2 is a diagramatical partial cross section thereof.

FIG. 1 and FIG. 2 illustrate an example of the capacitor of the present invention. FIG. 1 is a diagramatical perspective view of the capacitor, and FIG. 2 is a diagramatical partial cross section thereof.

The capacitor illustrated in the drawings comprises, for example, a disc-like dielectric porcelain layer 12 provided on its top and bottom surfaces with electrodes 11 (the top surface electrode only is shown in the drawing) respectively comprised of Al, Au, Ag, Ni or the like. The dielectric porcelain layer 12 contains a number of crystal grains 22 of the semiconductor porcelain in the form that they are interposed by an insulating layer 21 formed at boundaries.

The size of the crystal grains 22 is appropriately determined depending on the electrical characteristics to be required, amount for mixing component materials and conditions for firing, but, in usual cases, it may desirably range from 1 $\mu$m to 100 $\mu$m, preferably 40 $\mu$m to 80 $\mu$m.

EXAMPLES

The present invention will be described below in further greater detail by specifically giving Examples.

EXAMPLE 1

Raw materials $TiO_2$, SrO, $MnO_2$, $Y_2O_3$ and $SiO_2$ were so weighed that semiconductor porcelains having the compositional ratio as shown in Table 1 can be obtained, and ground and mixed for 12 hours using a wet ball mill. After the resulting mixtures were dried, a small amount of polyvinyl alcohol was added thereto as a binder to carry out granulation to 24 to 80 meshes, followed by oil-pressure pressing to mold discs of 20 mm in diameter and 0.7 mm in thickness. Subsequently the resulting molded discs were calcined at 950° C. in the atmosphere to burn out the binder. After cooled to room temperature, the resulting discs were fired for 4 hours at 1,400° C. in a reductive atmosphere comprising 10% by volume of hydrogen and 90% by volume of nitrogen to obtain semiconductor porcelains.

Next, prepared each was a suspension comprising; ethyl alcohol:$Bi_2O_3$=10:1; ethyl alcohol:$Bi_2O_3$:CuO=10:0.7:0.3; ethyl alcohol:$Bi_2O_3$:CuO=10:0.95:0.05; ethyl alcohol:$Bi_2O_3$:CuO=10:0.5:0.5; or ethyl alcohol:$Na_2O$=10:1. The above semiconductor porcelains were dipped in any one of the above suspension, and thereafter baked for 0.5 hour at 1,250° C. in an oxidative atmosphere to form an insulating layer at the crystal grain boundaries.

Silver pastes were applied on the both surfaces of the discs of dielectric porcelains thus obtained (Samples No. 1 to No. 42), followed by baking for 30 minutes at 850° C. to form electrodes, thus preparing capacitors.

The dielectric constant ($\epsilon$), dielectric loss (tan$\delta$), insulation resistance (IR) and temperature characteristics of dielectric constant (temperature variation at $-25°$ C. to $+85°$ C. around the standard temperature of 25° C.) of the dielectric porcelains constituting the capacitors thus obtained were measured to obtain the results as shown in Table 2. The measurement was made under the conditions of 25° C. and a frequency of 1 kHz. In Tables 1 and 2, the symbol "*" denotes samples outside the scope of the present invention. As shown in Table 1 and Table 2, the dielectric porcelains that employ the ceramic-forming composition for use in the capacitor of the present invention showed very good characteristics, a high dielectric constant, a small tan $\delta$, a large insulation resistance and a small temperature variation of dielectric constant at $-25°$ C. to $+85°$ C. around standard 25° C., as compared with conventional products.

TABLE 1

| Sample No. | Composition of main components (mol %) | | Contents of other components (mol part based on 100 mol part of main components) | | | Additives for forming insulating layer |
|---|---|---|---|---|---|---|
| | $TiO_2$ | SrO | $MnO_2$ | $Y_2O_3$ | $SiO_2$ | |
| *1 | 50.00 | 50.00 | 3.50 | 0.12 | — | $Bi_2O_3$ |
| 2 | 50.40 | 49.60 | 3.50 | 0.12 | — | ↑ |
| 3 | 51.00 | 49.00 | 3.50 | 0.12 | — | ↑ |
| 4 | 53.40 | 46.60 | 3.50 | 0.12 | — | ↑ |
| *5 | 53.60 | 46.40 | 3.50 | 0.12 | — | ↑ |
| *6 | 51.00 | 49.00 | 1.80 | 0.12 | — | ↑ |
| 7 | 51.00 | 49.00 | 2.10 | 0.12 | — | ↑ |
| 8 | 51.00 | 49.00 | 3.00 | 0.12 | — | ↑ |
| 9 | 51.00 | 49.00 | 4.80 | 0.12 | — | ↑ |
| *10 | 51.00 | 49.00 | 5.10 | 0.12 | — | ↑ |
| 11 | 51.00 | 49.00 | 3.50 | 0.12 | 0.20 | ↑ |
| 12 | 51.00 | 49.00 | 3.50 | 0.12 | 0.80 | ↑ |
| 13 | 51.00 | 49.00 | 3.50 | 0.12 | 1.40 | ↑ |
| 14 | 51.00 | 49.00 | 3.50 | 0.12 | 1.80 | ↑ |
| 15 | 51.00 | 49.00 | 3.50 | 0.12 | 2.10 | ↑ |
| *16 | 51.00 | 49.00 | 3.50 | 0.04 | — | ↑ |
| 17 | 51.00 | 49.00 | 3.50 | 0.06 | — | $Bi_2O_3$ |
| 18 | 51.00 | 49.00 | 3.50 | 0.20 | — | ↑ |
| 19 | 51.00 | 49.00 | 3.50 | 0.27 | — | ↑ |
| *20 | 51.00 | 49.00 | 3.50 | 0.31 | — | ↑ |
| 21 | 51.00 | 49.00 | 2.10 | 0.12 | — | $Na_2O$ |
| 22 | 51.00 | 49.00 | 3.00 | 0.12 | — | ↑ |
| 23 | 51.00 | 49.00 | 4.80 | 0.12 | — | ↑ |
| 24 | 51.00 | 49.00 | 3.00 | 0.12 | 0.80 | ↑ |
| 25 | 51.00 | 49.00 | 3.00 | 0.12 | 2.10 | ↑ |
| 26 | 50.40 | 49.60 | 3.50 | 0.12 | 0.03 | $Bi_2O_3$/CuO = 70/30 |
| 27 | 51.00 | 49.00 | 3.50 | 0.12 | 0.03 | ↑ |
| 28 | 51.00 | 49.00 | 2.10 | 0.12 | 0.03 | ↑ |
| 29 | 51.00 | 49.00 | 3.50 | 0.20 | 0.03 | ↑ |

TABLE 1-continued

| Sample No. | Composition of main components (mol %) | | Contents of other components (mol part based on 100 mol of main components) | | | Additives for forming insulating layer |
|---|---|---|---|---|---|---|
| | TiO₂ | SrO | MnO₂ | Y₂O₃ | SiO₂ | |
| 30 | 51.00 | 49.00 | 3.50 | 0.12 | 0.007 | ↑ |
| 31 | 51.00 | 49.00 | 3.50 | 0.12 | 0.01 | ↑ |
| 32 | 51.00 | 49.00 | 3.50 | 0.12 | 0.1 | ↑ |
| 33 | 51.00 | 49.00 | 3.50 | 0.12 | 0.12 | ↑ |
| 34 | 51.00 | 49.00 | 3.50 | 0.12 | 1.0 | Bi₂O₃/CuO = 70/30 |
| 35 | 51.00 | 49.00 | 3.50 | 0.12 | 1.8 | ↑ |
| 36 | 51.00 | 49.00 | 3.50 | 0.12 | 2.2 | ↑ |
| 37 | 51.00 | 49.00 | 3.50 | 0.12 | 0.03 | Bi₂O₃ |
| 38 | 51.00 | 49.00 | 3.50 | 0.12 | 0.1 | ↑ |
| 39 | 51.00 | 49.00 | 3.50 | 0.12 | — | Bi₂O₃/CuO = 70/30 |
| 40 | 51.00 | 49.00 | 3.50 | 0.12 | 0.03 | Bi₂O₃/CuO = 95/5 |
| 41 | 51.00 | 49.00 | 3.50 | 0.12 | 0.03 | Bi₂O₃/CuO = 50/50 |
| 42 | 51.00 | 49.00 | 3.50 | 0.12 | 0.06 | Bi₂O₃/CuO = 70/30 |

(*Out of the scope of the invention; same in the following tables)

TABLE 2

| Sample No. | $\epsilon$ | tan δ (%) | IR (MΩ) | temperature variation of dielectric constant (%, w.r.t. 25° C.) | |
|---|---|---|---|---|---|
| | | | | −25° C. | +85° C. |
| *1 | 74,000 | 0.8 | 4,800 | 11.4 | −11.3 |
| 2 | 130,000 | 0.7 | 4,400 | 8.1 | −7.8 |
| 3 | 132,000 | 0.7 | 4,300 | 8.2 | −6.8 |
| 4 | 101,000 | 0.8 | 3,900 | 9.1 | −7.9 |
| *5 | 89,000 | 1.3 | 3,100 | 10.2 | −9.8 |
| *6 | 81,000 | 0.7 | 4,600 | 12.2 | −9.8 |
| 7 | 118,000 | 0.6 | 4,100 | 8.1 | −7.8 |
| 8 | 134,000 | 0.5 | 3,900 | 7.5 | −7.3 |
| 9 | 111,000 | 0.8 | 4,200 | 8.2 | −8.1 |
| *10 | 92,000 | 1.9 | 4,300 | 8.5 | −7.8 |
| 11 | 131,000 | 0.5 | 4,700 | 8.1 | −6.5 |
| 12 | 130,000 | 0.4 | 5,100 | 7.5 | −6.2 |
| 13 | 128,000 | 0.5 | 5,400 | 7.6 | −6.3 |
| 14 | 125,000 | 0.6 | 5,500 | 7.8 | −6.9 |
| 15 | 98,000 | 1.2 | 5,900 | 8.8 | −7.0 |
| *16 | 81,000 | 0.6 | 7,500 | 8.2 | −8.1 |
| 17 | 106,000 | 0.6 | 6,700 | 7.6 | −8.3 |
| 18 | 115,000 | 0.8 | 3,500 | 6.9 | −7.4 |
| 19 | 108,000 | 0.9 | 3,200 | 7.8 | −8.0 |
| *20 | 93,000 | 1.7 | 2,200 | 6.5 | −6.3 |
| 21 | 140,000 | 0.6 | 3,900 | 7.4 | −6.3 |
| 22 | 144,000 | 0.7 | 3,500 | 6.8 | −8.2 |
| 23 | 128,000 | 0.8 | 3,400 | 7.4 | −8.1 |
| 24 | 137,000 | 0.5 | 4,300 | 6.5 | −7.0 |
| 25 | 95,000 | 1.2 | 4,500 | 8.1 | −8.7 |
| 26 | 140,000 | 0.7 | 8,300 | 8.0 | −7.6 |
| 27 | 143,000 | 0.6 | 8,100 | 8.3 | −6.9 |
| 28 | 131,000 | 0.6 | 7,600 | 8.0 | −7.5 |
| 29 | 127,000 | 0.8 | 6,800 | 6.8 | −7.5 |
| 30 | 135,000 | 0.7 | 4,700 | 8.3 | −6.3 |
| 31 | 138,000 | 0.7 | 6,100 | 8.4 | −6.4 |
| 32 | 141,000 | 0.6 | 7,200 | 8.2 | −7.5 |
| 33 | 139,000 | 0.6 | 5,300 | 8.1 | −6.9 |
| 34 | 130,000 | 0.5 | 5,300 | 8.3 | −7.1 |
| 35 | 127,000 | 0.6 | 5,500 | 8.5 | −6.5 |
| 36 | 100,000 | 1.2 | 5,800 | 8.1 | −6.8 |
| 37 | 132,000 | 0.7 | 4,400 | 8.2 | −6.7 |
| 38 | 131,000 | 0.6 | 4,600 | 8.1 | −6.6 |
| 39 | 134,000 | 0.7 | 4,500 | 8.2 | −6.5 |
| 40 | 134,000 | 0.7 | 4,700 | 8.5 | −6.8 |
| 41 | 121,000 | 0.7 | 8,200 | 8.6 | −7.1 |
| 42 | 143,000 | 0.6 | 7,700 | 8.8 | −6.8 |

As will be clear from the above Examples, the ceramic-forming composition of the present invention, even though having high characteristics such as a high dielectric constant ($\epsilon$), a small dielectric loss (tanδ) and a large insulation resistance, makes it possible to constitute a dielectric porcelain having good and high characteristics such that the temperature variation of dielectric constant is small at −25° C. to +85° C.

Thus, the ceramic-forming composition, dielectric porcelain substrate and dielectric porcelain substrate of the present invention can constitute a capacitor of high performance.

We claim:

1. A dielectric substrate having an insulating layer containing at least one oxide selected from the group consisting of iron oxide, cobalt oxide, vanadium oxide, chromium oxide, lead oxide, bismuth oxide, copper oxide, sodium oxide, and mixtures thereof present at crystal grain boundaries of a semiconductor porcelain comprising a fired product of a ceramic-forming composition consisting essentially of: (a) 100 moles of main components, said main components consisting essentially of: (i) from 50.20 to 53.50 mole % of TiO₂ and (ii) from 49.80 to 46.50 mole % of SrO; (b) from 2.0 to 5.0 moles of MnO₂; and (c) 0.05 to 0.30 mole of Y₂O₃.

2. The dielectric porcelain substrate according claim 2, further consisting essentially of from 0.01 to 2.0 moles of SiO₂ per 100 moles of the said main components.

3. The dielectric porcelain substrate of claim 1, wherein said insulating layer contains at least one oxide selected from the group consisting of iron oxide, cobalt oxide, vanadium oxide, chromium oxide, lead oxide and mixtures thereof.

4. The dielectric porcelain substrate of claim 1, wherein said insulating layer contains at least one oxide selected from the group consisting of bismuth oxide, copper oxide, sodium oxide and mixtures thereof.

5. A dielectric porcelain substrate having an insulating layer containing a mixture of bismuth oxide and copper oxide present at crystal grain boundaries of a semiconductor porcelain comprising a fired product of a ceramic-forming composition consisting essentially of: (a) 100 moles of main components, said main components consisting of: (i) from 50.20 to 53.50 mole % of TiO₂ and (ii) from 49.80 to 46.50 mole % of Sro; (b) from 2.0 to 5.0 moles of MnO₂; and (c) from 0.05 to 0.30 mole of Y₂O₃.

6. The dielectric porcelain substrate of claim 5, wherein the weight ratio of said bismuth oxide to said copper oxide is 9:1 to 6:4.

7. A dielectric porcelain substrate having an insulating layer containing a mixtrue of bismuth oxide and copper oxide present at crystal grain boundaries of a semiconductor porcelain comprising a fired product of a ceramic-forming composition consisting essentially of: (a) 100 moles of main components, said main components consisting of: (i) from 50.20 to 53.50 mole % of TiO₂ and (ii) from 49.80 to 46.50 mole % of SrO; (b) from 2.0 to 5.0 moles of MnO₂; (c) from 0.05 to 0.30 mole of Y₂O₃; and (d) from 0.01 to 2.0 moles of SiO₂ per 100 moles of main components.

8. The dielectric porcelain substrate of claim 7, wherein the weight ratio of bismuth oxide to said copper oxide is 9:1 to 6:4.

9. A capacitor comprising a pair of electrodes and a dielectric porcelain interposed between said electrodes, said dielectric porcelain having an insulating layer containing at least one oxide selected from the group consisting of iron oxide, cobalt oxide, vanadium oxide, chromium oxide, lead oxide, bismuth oxide, copper oxide, sodium oxide, and mixtures thereof present at crystal grain boundaries of a semiconductor porcelain comprisng a fired product of a ceramic-forming composition cosisting essentially of: (a) 100 moles of main components, said main components consisting of: (i) from 50.20 to 53.50 mole % of $TiO_2$ and (i) from 49.80 to 46.50 mole % of SrO; (b) from 2.0 to 5.0 moles of $MnO_2$; and (c) from 0.05 to 0.30 mole of $Y_2O_3$.

10. The capacitor of claim 9, further consisting essentially of said ceramic-forming composition from 0.01 to 2.00 moles of $SiO_2$ per 100 moles of the said main components.

11. A capacitor comprising a pair of electrodes and a dielectric porcelain interposed between said electrodes, said dielectric porcelain having an insulating layer containing a mixture of bismuth oxide and copper oxide present at crystal grain boundaries of a semiconductor porcelain comprising a fired product of a ceramic-forming composition consisting essentially of: (a) 100 moles of main components, said main components consisting of: (i) from 50.20 to 53.50 moles % of $TiO_2$ and (ii) from 49.80 to 46.50 mole % of SrO; (b) from 2.0 to 5.0 moles of $MnO_2$; and (c) from 0.05 to 0.30 mole of $Y_2O_3$.

12. The capacitor of claim 11, wherein the weight ratio of said bismuth oxide to said copper oxide is 9:1 to 6:4.

13. The capacitor of claim 11, further consisting essentially of from 0.01 to 0.1 mole parts of $SiO_2$ per 100 moles of said main components, and wherein said insulating laye contains a mixture of bismuth oxide and copper oxide.

14. The capacitor of claim 13, wherein the ratio of said bismuth oxide to said copper oxide is 9:1 to 6:4.

15. The capacitor of claim 11, wherein said electrodes contain at least one element selected from the group consisting of Al, Au, Ag and Ni.

* * * * *

UNITED STATES PATENT AND TRADEMARK OFFICE
CERTIFICATE OF CORRECTION

PATENT NO. : 5,006,957
DATED : April 9, 1991
INVENTOR(S) : MOTOO KUMAGAI ET AL.  Page 1 of 3

It is certified that error appears in the above-identified patent and that said Letters Patent is hereby corrected as shown below: ON TITLE PAGE:

AT [54] TITLE

"SEMICONDUCTOR" should read --CERAMIC-FORMING COMPOSITION, AND SEMICONDUCTOR--.

AT [56] REFERENCES CITED

U.S. Patent Documents,
"2,648,804  8/1963  Steigeralt et al." should read
--2,648,804  8/1953  Steigeralt et al.--.

Attorney, Agent or Firm
"Fitzpatrick, Cella Harper & Scinto" should read
--Fitzpatrick, Cella, Harper & Scinto--.

COLUMN 1

Title, "SEMICONDUCTOR" should read --CERAMIC-FORMING COMPOSITION, AND SEMICONDUCTOR--.
Line 6, "continuation-in-part" should read --continuation--.

COLUMN 2

Line 17, "diagramatical" should read --diagrammatical--.
Line 20, "diagramatical" should read --diagrammatical--.

COLUMN 4

Line 12, "ing the" should read --ing to the--.

UNITED STATES PATENT AND TRADEMARK OFFICE
CERTIFICATE OF CORRECTION

PATENT NO. : 5,006,957
DATED : April 9, 1991
INVENTOR(S) : MOTOO KUMAGAI ET AL.

It is certified that error appears in the above-identified patent and that said Letters Patent is hereby corrected as shown below:

COLUMN 5

Line 37, "diagramatical" should read --diagrammatical--.
Line 39, "gramatical" should read --grammatical--.

COLUMN 6

Line 3, "cooled" should read --being cooled--.
Line 14, "suspension," should read --suspensions,--.

COLUMN 8

Line 4, "dielectric" should read --semiconductor--.
Line 9, "dielectric substrate" should read --dielectric porcelain substrate--.
Line 20, "(c) 0.05" should read --(c) from 0.05--.
Line 22, "2," should read --1,--.
Line 40, "Sro;" should read --SrO;--.
Line 48, "mixtrue" should read --mixture--.
Line 59, "bismuth oxide" should read --said bismuth oxide--.

COLUMN 9

Line 2, "cosisting" should read --consisting--.
Line 4, "(i)" should read --(ii)--.

UNITED STATES PATENT AND TRADEMARK OFFICE
CERTIFICATE OF CORRECTION

PATENT NO. : 5,006,957
DATED : April 9, 1991
INVENTOR(S) : MOTOO KUMAGAI ET AL.

Page 3 of 3

It is certified that error appears in the above-identified patent and that said Letters Patent is hereby corrected as shown below:

COLUMN 10

Line 1, "moles %" should read --mole %--.
Line 10, "laye" should read --layer--.

Signed and Sealed this

Eighteenth Day of August, 1992

Attest:

DOUGLAS B. COMER

*Attesting Officer*        Acting Commissioner of Patents and Trademarks